Oct. 8, 1963  H. A. KOPPS  3,106,189
ALL WEATHER STOCK WATER MEANS
Filed April 8, 1960  2 Sheets-Sheet 1

INVENTOR
HARRY A. KOPPS
BY M. Talbert Dick
ATTORNEY

WITNESS
NORMAN G. TRAVISS

Oct. 8, 1963 H. A. KOPPS 3,106,189
ALL WEATHER STOCK WATER MEANS
Filed April 8, 1960 2 Sheets-Sheet 2

INVENTOR
HARRY A. KOPPS
BY M. Talbert Dick
ATTORNEY

WITNESS
NORMAN G. TRAVISS

United States Patent Office 3,106,189
Patented Oct. 8, 1963

3,106,189
ALL WEATHER STOCK WATER MEANS
Harry A. Kopps, Griggsville, Ill.
Filed Apr. 8, 1960, Ser. No. 21,040
1 Claim. (Cl. 119—73)

This invention relates to livestock water tanks and more particularly to a stock watering means that will not only not freeze during the winter months but will, in the hot months of the year, provide relatively cool drinking water.

The chief attention given to stock watering equipment has been the preventing of the freezing of the drinking water when the temperature drops below the freezing point. Obviously this is a most important phase in the raising of stock inasmuch as the livestock cannot drink the needed water if it is frozen. However, it is also important that the water be fresh and cool during the summer season, and little if anything has been done to accomplish this highly desirable condition. In fact, the very nature of an open-top stock tank or water trough lends itself to the absorption of heat from the rays of the sun. In the preventing of water tank freezing, the usual method and/or means is to artifically heat the water by auxiliary means such as coal burners, oil burners, gas burners, and electric heaters. Such heating means are expensive to manufacture, install and maintain. Even if it be of the automatic type, it still must be frequently inspected to determine if it is still functioning. Also if it uses any electricity either to heat or operate the equipment, there is always present the possibility of an electric power failure.

Therefore, one of the principal objects of my invention is to provide an animal watering means that does not use either electric power or fuel to prevent the freezing of the water during the cold months of the year.

A further object of this invention is to provide an animal watering means that provides relatively cool water during the hot months of the year.

A still further object of this invention is to provide a livestock watering device that requires little attention after it has been installed for animal usage.

A still further object of this invention is to provide an animal watering means that is not easily damaged by the animals using it.

A still further object of this invention is to provide an animal watering source that protects the water from the elements such as dust, and also from contamination by flying insects.

Still further objects of my invention are to provide an all weather stock water means that is economical in manufacture, durable in use, and refined in appearance.

These and other objects will be apparent to those skilled in the art.

My invention consist in the construction, arrangements, and combination, of the various parts of the device, whereby the objects contemplated are attained as hereinafter more fully set forth, specifically pointed out in my claim, and illustrated in the accompanying drawings, in which:

Figure 1:
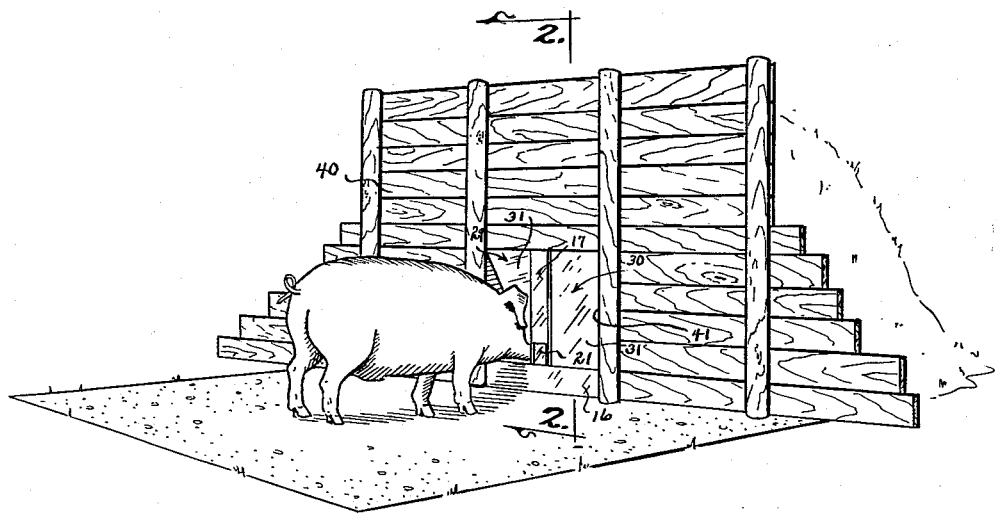
FIG. 1 is a perspective view of my device installed and in use.
Figure 2:
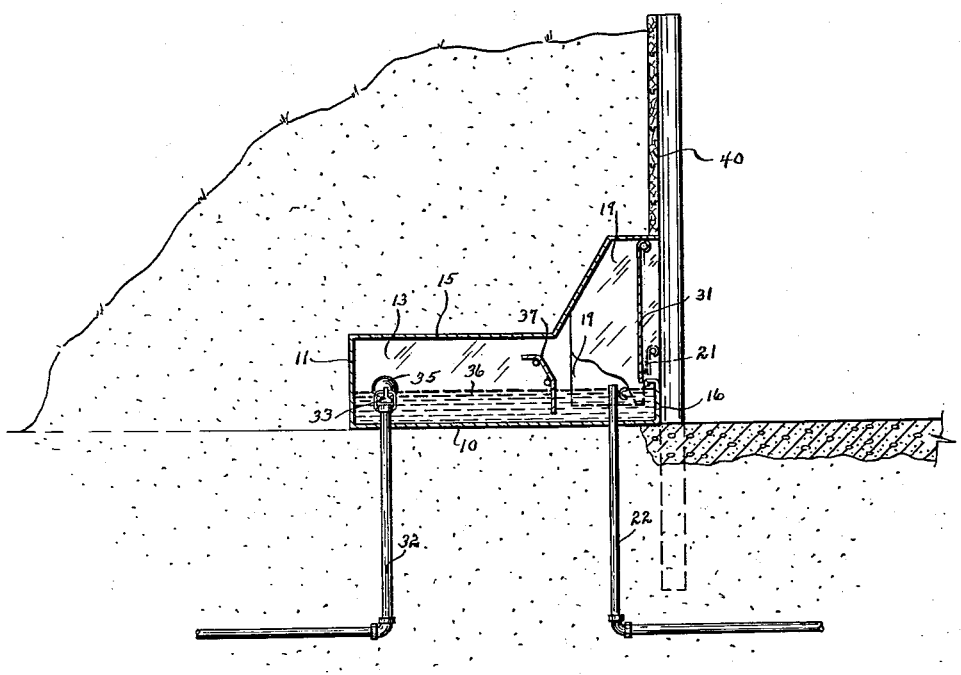
FIG. 2 is a longitudinal sectional view of my device on an enlarged scale and taken on line 2—2 of FIG. 1.
Figure 3:
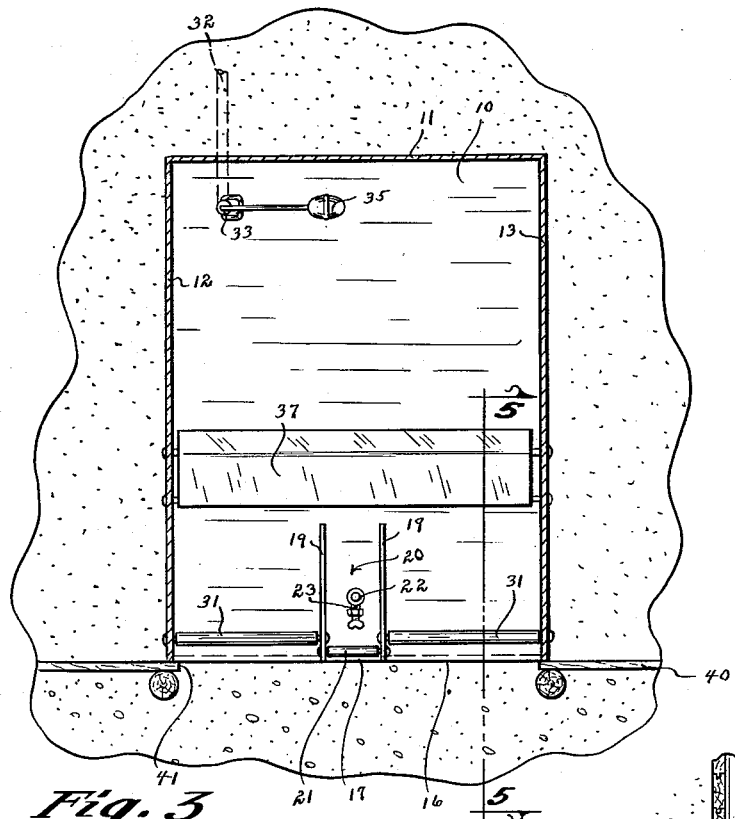
FIG. 3 is an enlarged top plan sectional view of my watering means and more fully illustrates its construction.
Figure 4:
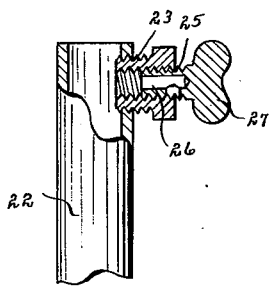
FIG. 4 is an enlarged side sectional view of the upper free end portion of the over-flow pipe and its adjustable drip valve.
Figure 5:
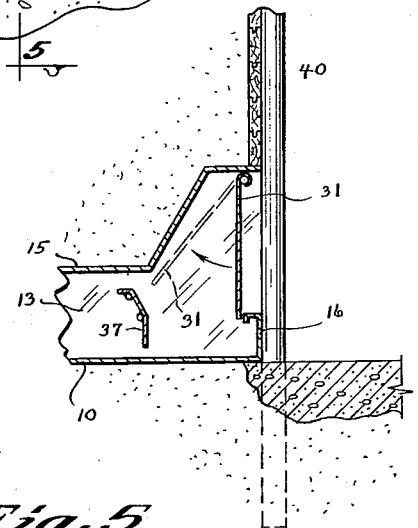
FIG. 5 is a longitudinal sectional view on an enlarged scale of the front end portion of the device taken on line 5—5 of FIG. 3.

My device has a tank consisting of a horizontal bottom 10, a rear end wall 11, two side walls 12 and 13, a top 15, and a partial front vertical wall 16. The horizontal top of the short vertical wall 16 is substantially below that of the horizontal plane of the top 15, as shown in FIG. 2. The front open end portion of the tank above the wall 16 is elevated and enlarged to provide a relatively large opening as shown in FIG. 5. The numeral 17 designates a vertical panel extending from the top center of the wall 16 upwardly to the center of the forward end of the top 15. At each of the side edges of the panel 17 is a rearwardly extending divider plate 19. These two spaced apart divider plates 19 provide with the panel 17 a shielded area 20. The numeral 21 designates a small hinged door in the lower area of the panel 17. The numeral 22 designates an over-flow pipe extending upwardly in the area 20. This pipe has its upper open end terminating in a horizontal plane just below the horizontal plane of the top edge of the wall 16. The numeral 23 designates a conduit communicating with the inside of the over-flow pipe a short distance below the top of the over-flow pipe. Threaded into this conduit is a valve core 25 having a bore 26 extending from its forward end and exiting at its side as shown in FIG. 4. By this arrangement when the valve core 25 is in an unscrewed outer position, water may pass into its bore 26 from the tank and downwardly through the over-flow pipe. This over-flow pipe extends to a disposal area not shown. When the valve core is threaded to a maximum position within the conduit 23, the inlet end of the bore will be within the conduit and thus closed. As the exposure of the bore may be only partial to the inside of the tank, due to the valve core 25 being threaded into the conduit 23, the water outlet through the bore is adjustable by rotating the core handle 27. This handle is reached through the door 21. At each side of the panel 17 is a door area designated by the numerals 29 and 30, respectively. Normally closing each of these two door areas is a door 31 hinged at its top to a side of the tank and one of the divider shield plates as shown in FIG. 3. Each of these doors extends downwardly to a point below the inside top of the wall 16. The numeral 32 designates a water supply pipe extending into the rear end area of the tank having the usual float actuated valve 33. The float 35 of this valve maintains a predetermined water level in the tank and which is in a plane slightly above that of the valve core 25. When the level of the water 36 falls below the predetermined level, the float drops accordingly and opens the valve 33. This pipe 32 is adapted to be in communication with a source of water supply under pressure. When installed, this pipe 32 and the over-flow pipe 22, should extend downwardly in the ground from the bottom of the tank, to points below the frost line. This insures the pipe against freezing during the winter months, and also the incoming water through the pipe 32, will be earth warmed and will be of a temperature well above thirty degrees Fahrenheit. Directly back of the swinging inward arches of the doors is a baffle 37. This animal baffle terminates above the tank bottom so that water may pass from the rear end of the tank to the front or trough portion of the tank. To install my device I provide a large vertical barricade wall 40. The tank is placed to the rear of this wall and the wall has a lower rectangular opening 41 exposing the wall 16, doors 31, panel 17, and a small door 21 as shown in FIG. 1. Next I bank a mound of earth back of the barricade wall and over and around the top, sides, and rear end of the tank as shown in FIG. 2. This earth mound insulates the tank from both the cold of winter and the hot sun of summer. To further have relatively warm water in the winter and relatively cold water in the summer, I at least partially open the valve core 25 to permit a volume of water to escape through the overflow pipe. As the water level is constantly being dropped, new water will be continuously furnished to the rear end area of the tank through the pipe 32. The tank water will obviously move to the front area of the tank and even this continuous circulation of the water will prevent its freezing during the colder months. This forward flow of water is further caused by the animals consuming water at the front of the device. In the summer time new fresh cool water will continuously feed into the tank. When an animal wishes a drink of water, it will push a door 31 inwardly and expose the water trough area of the tank. When the animal withdraws its head, the door will automatically close thereby preventing foreign matter from falling into the trough area of the tank.

From the foregoing it will be seen that I have provided a highly desirable economical water means for animals and one that will successfully function throughout the year.

Some changes may be made in the construction and arrangement of my all weather stock water means without departing from the real spirit and purpose of my invention, and it is my intention to cover by my claim, any modified forms of structure or use of mechanical equivalents which may be reasonably included within their scope.

I claim:

An animal watering means comprising in combination:
an enclosed tank having an opening formed in one vertically disposed front end wall thereof;
a door hingedly connected to said tank, suspended over so as to normally close said opening, and swingable inwardly of said tank;
float valve means mounted in said tank at an end thereof opposite said front end wall, and operable to maintain a certain level of water therein, said water being accessible through said opening by an animal;
a baffle plate mounted in a substantially vertically disposed transversely extended position within said tank intermediate said float valve means and said front end wall, the lower edge of said baffle plate spaced above the bottom of said tank;
overflow means mounted within said tank between said baffle plate and said front end wall, and including an adjustable valve for varying the quantity of water flowing from said tank through said overflow means for discharge, said valve mounted in a normally horizontal plane below said level of water maintained by said float valve means, whereby water is continually circulated through said tank; and
access means in said front end wall for manual accessibility to said overflow means from outside said tank.

References Cited in the file of this patent
UNITED STATES PATENTS

| | | |
|---|---|---|
| 1,446,493 | Belden | Feb. 27, 1923 |
| 1,541,471 | Black | June 9, 1925 |
| 1,560,088 | Marguardt | Nov. 3, 1925 |
| 1,655,674 | Cronenberger et al. | Jan. 10, 1928 |
| 2,724,365 | Snider | Nov. 22, 1955 |
| 2,865,327 | Anderson | Dec. 23, 1958 |